United States Patent [19]
Harsanyi

[11] Patent Number: 5,623,321
[45] Date of Patent: Apr. 22, 1997

[54] CIRCUIT FOR CUTTING OFF POWER TO AN ACTIVE RF COMPONENT

[75] Inventor: Stephen R. Harsanyi, Roxbury Township, Morris County, N.J.

[73] Assignee: Lucent Technologies Inc., Murray Hill, N.J.

[21] Appl. No.: 573,645

[22] Filed: Dec. 18, 1995

[51] Int. Cl.$^6$ .................................................. H04N 5/63
[52] U.S. Cl. ........................... 348/730; 455/3.3; 348/6; 379/413
[58] Field of Search .................................. 348/730, 682, 348/6, 8; 345/76, 212; 395/750, 375, 500; 455/3.3, 3.1, 6.3; 340/310.01, 310.06; 379/102, 413; H04N 5/63

[56] References Cited

U.S. PATENT DOCUMENTS

| | | | |
|---|---|---|---|
| 5,233,646 | 8/1993 | Kuromi | 340/310.01 |
| 5,313,282 | 5/1994 | Hayashi | 348/730 |
| 5,345,592 | 9/1994 | Woodmas | 455/3.3 |
| 5,389,952 | 2/1995 | Kikins | 348/730 |
| 5,467,384 | 11/1995 | Skinner, Sr. | 455/3.3 |
| 5,483,291 | 1/1996 | Karlock | 348/730 |

*Primary Examiner*—Glenton B. Burgess
*Attorney, Agent, or Firm*—Lester H. Birnbaum

[57] ABSTRACT

A circuit for cutting off power to selected components in a network which requires that backup power be supplied to other components. A monitoring signal is generated and combined with the power coupled to the components. A signal detector in the selected components determines the absence of the monitoring signal which is indicative of a commercial power outage. The signal detector then activates a cutoff mechanism which cuts off a portion of the component from the backup power without obstructing the flow of power and of the monitoring signal to the output of the component so power may be used by other downstream components.

14 Claims, 2 Drawing Sheets

CIRCUIT FOR CUTTING OFF POWER TO AN ACTIVE RF COMPONENT

FIELD OF THE INVENTION

This invention relates to combined broadband and telephony transmission systems.

BACKGROUND OF THE INVENTION

At present, subscribers usually receive telephony and cable TV services from different suppliers over separate networks. Power requirements for the networks are quite different. For example, in telephony networks, backup batteries must be supplied to continue services in the event of a power blackout. In cable TV systems, backup power is not required since a commercial power failure in the network usually means a power failure to the subscriber who would, therefore, not be able to receive the service anyway.

In the future, both types of services, as well as new broadband services (e.g., switched digital video), will be supplied from a single network. Such networks would still require backup power to maintain telephony service during commercial power outages. However, the presence of active RF components for providing broadcast TV in the network would create a substantial additional load on the batteries. If the active RF components could be powered down during commercial power outages, the size and number of batteries Could be reduced and the number of hours the batteries could operate would be increased.

SUMMARY OF THE INVENTION

The invention, in one aspect, is a circuit for cutting off power to an active RF component. The circuit includes means for detecting a monitoring signal supplied to the component at an input and means for cutting off the power to at least a portion of the component when this monitoring signal is not detected while permitting the power to be conducted to an output of the component. In accordance with another aspect, the invention is a system for supplying and cutting off power to an active RF component. The system includes means for generating a monitoring signal and means for combining the monitoring signal with the power for delivery to the active RF component. The system further comprises means for detecting the monitoring signal and means for cutting off the power to at least a portion of the active RF component when the monitoring signal is not detected while permitting the power to be conducted to an output of the component.

BRIEF DESCRIPTION OF THE DRAWING

These and other features of the invention are delineated in detail in the following description. In the drawing.

DETAILED DESCRIPTION

Figure 1:
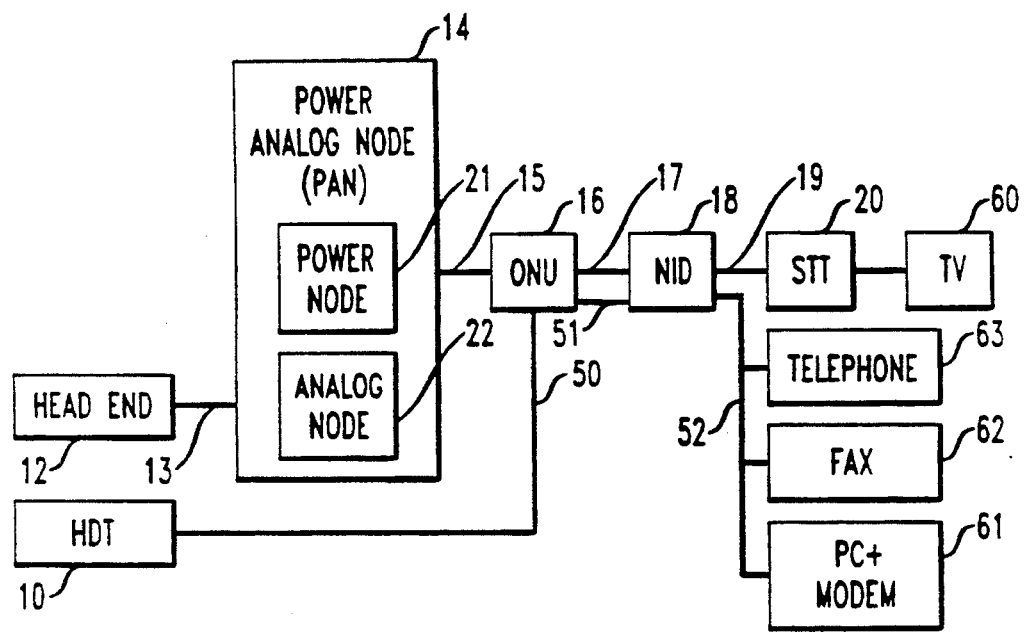
FIG. 1 is a block diagram of a system which may incorporate the invention.

Referring now to the drawings, in which like reference numerals identify similar or identical elements, FIG. 1 illustrates a system which may employ the invention. A traditional head end, 12, provides standard cable TV signals. The signals are carried over optical fiber links, 13, to the power analog nodes (PANs), one of which is shown as 14, where the analog broadcast video (cable TV) signal is converted from optical to electrical by an analog node, 22, and transported on coaxial cables, e.g., 15. The PAN, 14, also includes a source of power, 21, for powering all of the downstream (toward the end user) active components of the system which carry the analog broadcast video, new broadband services signals and telephony signals. The new broadband services signals and telephony signals are transported from a host digital terminal (HDT), 10, to optical network units (ONUs), one of which is shown as 16, on optical fibers, 50, on a separate path from the analog broadcast video. The coaxial cables, 15, carry both analog broadcast video signals and power to the ONUs. Each ONU is typically mounted on a pedestal or on a pole in the vicinity of a plurality of subscribers. Analog video signals (cable TV) are tapped off the cable, 15. The new broadband services signals and telephony signals transported on optical fibers, 50, are separated at the ONU and converted into electrical signals. The analog video signals (cable TV) are combined with the new broadband services signals (by a passive combiner network in the ONU or in a nearby pedestal) and delivered by means of a drop coaxial cable, 17, to a network interface device (NID), 18, which is typically mounted on the side of a subscriber's house. Telephony signals are connected from the ONU to the NID by means of twisted wire pairs, 51. A coaxial jumper cable, 19, carries both the analog broadcast (cable TV signals) and the new broadband services signals to the set top terminal (STT), 20, inside the house, while twisted wire pairs, 52, carry the telephony signals. The customer's equipment can be in the form of a TV, 60, computer, 61, FAX, 62, or telephone, 63.

Figure 2:
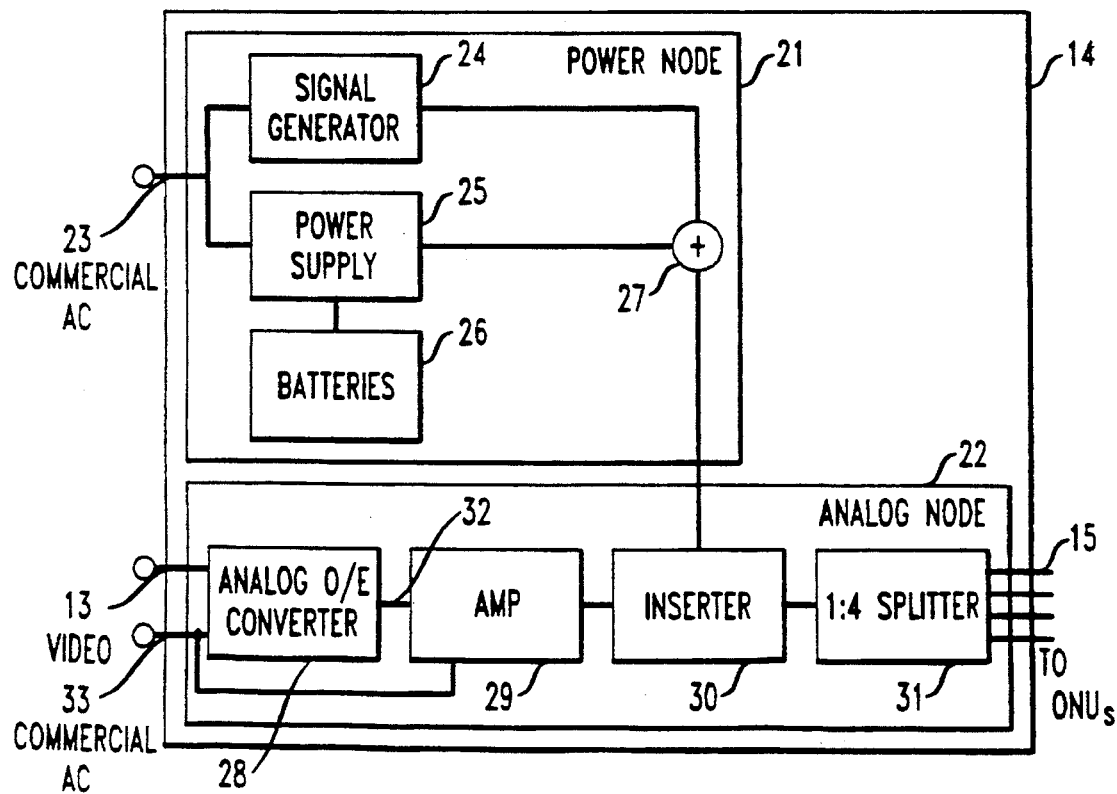
FIG. 2 is a block diagram of a portion of the system of FIG. 1 illustrating some features of the invention in accordance with one embodiment.

FIG. 2 illustrates some more detail in the power analog node, 14. In particular, the Figure illustrates some elements of the power node, 21, and the analog node, 22, which functions to transmit the analog broadcast video signals. The power node, 21, includes input conductors, 23, which carry standard commercial AC power to a signal generator, 24, and a power supply, 25. The signal generator, 24, generates a monitoring signal which has a frequency different from the power signal but which is within the passband of the power bypass in the AC power coupler, 36 of FIG. 3. The signal generator, 24, could be an oscillator which generates a single or multiple frequency analog signal or could be an apparatus which generates digital signals. The power supply, 25, can be a circuit which converts the standard commercial power to a form which is usable by the rest of the system, such as a 60-volt, 60-hertz waveform. The power supply, 25, has also a DC input from batteries, 26, and can convert the DC potential from the batteries, 26, to the same appropriate waveform in the event of a commercial power outage. It will be noted that the batteries are not coupled to the signal generator. The power supply also has a DC output to batteries, 26, to charge them. The outputs of the signal generator, 24, and power supply, 25, are coupled to a summer, 27, for combining them. It will be noted that, although the power supply, 25, the signal generator, 24, and the summer, 27, are shown as separate components, they can be incorporated into a single circuit. The output of the summer is coupled to a standard power inserter, 30, in the analog node, 22. The analog node, 22, receives the broadcast signal from the incoming fiber, 13, at an analog optical/ electrical converter, 28, which is also powered by commercial AC power on incoming wires, 33. The converter is coupled by a coaxial cable, 32, to a standard amplifier, 29, which is also powered by commercial AC power on incoming wires, 33. The amplifier, 29, in turn, is coupled by a coaxial cable to the power inserter, 30. The power inserter, 30, is coupled by a coaxial cable to a splitter, 31, which in this example is a 1:4 splitter which transmits the output on four coaxial cables, e.g., 15, to four respective ONUs, e.g., 16 of FIG. 1.

Figure 3:
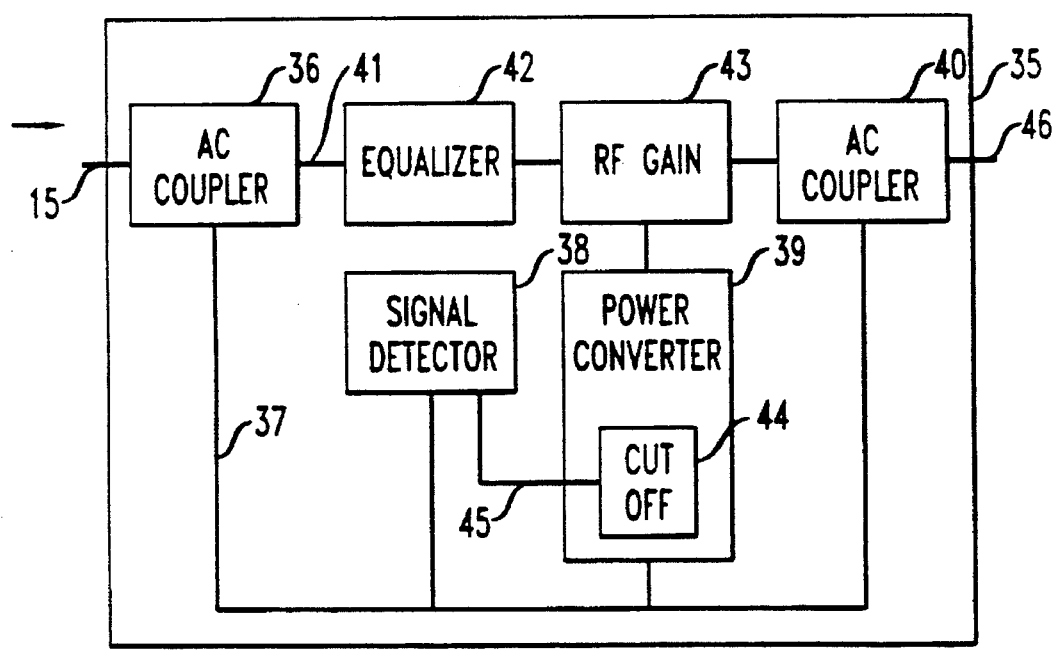
FIG. 3 is a block diagram of a further portion of the system of FIG. 1 illustrating some features of the invention in accordance with the same embodiment.

FIG. 3 illustrates an RF power amplifier, 35, which may be located at the ONU, 16, or at some location between the PAN, 14, and the ONU, 16. The incoming coaxial cable, 15, is connected to an AC power coupler, 36, which separates the RF signal from the power and the monitoring signal from generator 24 of FIG. 2. The power and the monitoring signal appear on conductor, 37, (the power bypass) which is coupled to a signal detector, 38, a power converter, 39, and a second AC power coupler, 40. The RF signal appears on conductor 41, which is coupled to an equalizer, 42. The equalizer, 42, is coupled to the RF gain portion, 43, of the amplifier, 35. The output of the gain portion, 43, is coupled to the AC power coupler, 40. The power converter, 39, is also coupled to the gain portion, 43. The power converter, 39, converts the power supplied on conductor, 37, to a power format, such as DC, which is appropriate for powering the gain portion. The power converter, 39, also includes some cutoff means, 44, such as a relay or other type of switch, which cuts off power to the gain portion, 43, (and possibly all or at least a portion of the power converter) in response to a signal from the detector, 38, on conductor, 45. (It will be appreciated that the cutoff means, 44, may be located at some other portion of the amplifier, 35.) The output of the coupler, 40, is coupled to coaxial cable, 46, to feed power and analog broadcast video signals to downstream components. Alternatively, the power signal from AC coupler, 40, could terminate in the ONU while the video signals are transmitted downstream.

In operation, returning to FIG. 2, the signal generator, 24, will generate a monitoring signal as long as it receives power from the commercial source on conductors 23. Therefore, during normal operation, the monitoring signal will be combined with the power from power supply, 25, by summer, 27, and the power and monitoring signal will be added to the broadcast video signal by inserter, 30. Now referring to FIG. 3, this combined power, monitoring signal and video signal will be received by AC power coupler, 36, which as previously stated, will separate the power and monitoring signal from the video signal. Therefore, the power and the monitoring signal will be coupled to the detector, 38, the power converter, 39, and the AC power coupler, 40, for recombination with the video signal. As long as the monitoring signal is detected by the detector, 38, the gain portion, 43, of the amplifier will continue to receive power from the power converter, 39, and function in the normal manner, amplifying the video signal.

In the event of a commercial power outage, the generator, 24 of FIG. 2, will no longer receive power, and, consequently, will stop producing the monitoring signal supplied to the amplifier, 35 of FIG. 3. The absence of the monitoring signal will be detected by the signal detector, 38, which will activate the cutoff means, 44. As a result, the gain portion, 43, will no longer receive power from the converter, 39, essentially turning off the amplifier, 35. (The cutoff means, 44, may also turn off all or a portion of the power converter depending on whether the signal detector, 38, has its own power supply or is powered by the converter, 39.) Normal power will continue to be supplied to other elements, however, through conductor, 37, and AC power coupler, 40, even in the absence of the video signal. Power can also continue to be supplied to the signal detector, 38, by the conductor, 37, or by the power converter, 39, during the commercial power outage. As soon as the detector, 38, again detects the presence of the monitoring signal on conductor, 37, it will deactivate the cutoff means, 44, and normal operation will be restored.

It will be appreciated that the invention provides a convenient way of powering down the active RF components in a combined broadcast and telephony system during power outages, while continuing to supply power to other components so as not to interrupt telephony service.

While the invention describes powering down an RF amplifier, it will be appreciated that the invention could also be used to power down other active components such as interdiction devices.

What is claimed is:

1. A circuit for cutting off power to an active RF component comprising:

a coupler for receiving at an input a combined power, monitoring signal, and video signal and for separating the power and monitoring signal from the video signal; and means for detecting the monitoring signal supplied to the input and means for cutting off the power to at least a portion of the component when the monitoring signal is not detected while permitting the power to be conducted to an output of the component.

2. A circuit according to claim 1 wherein the active RF component is an amplifier.

3. A circuit according to claim 2 wherein the amplifier comprises a gain portion and a power converter coupled to the gain portion such that the power converter converts the power to a power format applied to the gain portion.

4. A circuit according to claim 3 wherein the power converter includes the means for cutting off the power, and the detector is coupled to said means in the power converter.

5. A circuit according to claim 3 wherein the circuit further comprises a second coupler for recombining the power with the video signal.

6. A circuit according to claim 1 wherein the means for cutting off the power comprises a cutoff switch which is activated by a signal from the signal detector.

7. A system for supplying and cutting off power to an active RF component comprising:

means for generating a monitoring signal when commercial power is supplied thereto;

means for combining the monitoring signal with the power and coupling the combined monitoring signal and power to the active RF component;

means for detecting the monitoring signal; and means for cutting off the power to at least a portion of the component in response to an absence of the monitoring signal while permitting the power to be conducted to an output of the component.

8. A system according to claim 7 wherein the monitoring signal and the power are combined by a summer.

9. A system according to claim 7 further comprising means for combining the monitoring signal and the power with a video signal.

10. A system according to claim 7 wherein the signal generator is an oscillator.

11. A system according to claim 9 where the RF component is an amplifier which comprises a first coupler for separating the monitoring signal and the power from the video signal and a second coupler for recombining the monitoring signal and the power with the video at the output thereof.

12. A system according to claim 11 wherein the amplifier further comprises a gain portion and a power converter coupled thereto, the power converter converting the power for application to the gain portion.

13. A system according to claim 12 wherein the means for cutting off the power is part of the power converter.

14. A system according to claim 12 wherein the power and the monitoring signal are coupled to a conductor, and the signal detector, power converter and second coupler are coupled to the conductor.

* * * * *